(12) United States Patent
Page

(10) Patent No.: X9528
(45) Date of Patent: Mar. 21, 1836

(54) MORTISING TIMBER

(76) Inventor: George Page

George Page of Keene New Hampshire

Letters Patent

The Schedule referred to in these Letters Patent and making part of the same containing a description in the words of the said George Page himself of his improvement in the machine for mortising Large Timber Be it Known that I George Page of Keene in the County of Cheshire and State of New Hampshire have invented a new and useful machine for making mortises in large timber, and that the following is a full and exact description of the construction and operation of said machine as invented by me. The exterior part of the machine is a cast iron Box open at top and bottom, about two feet long and seven inches wide. The sides and ends are cast separately and fastened together by screws passing through the ends into ears, on the inside of the side pieces. Ears also project two from each side quite at the ends and bottom of the box on the outside through which is cut a female screw. Underneath each end of the box and under the ears last described is placed a bar of iron about eleven inches long one and a half inch wide and one inch thick, through each end of which a hole is drilled to receive a round tenon on the end of the screw which passes through the ears above. These holes are countersunk on the lower side and the end of the tenons headed. The bars rest upon the timber to be mortised and by turning the screws the box can be raised or lowered and thus the depth of the mortise may be regulated, and by turning one or more of the screws of the machine may be levelled or squared with the plumb spots. At the bottom of the end pieces inside, at or near the center, ears project thro' which a hole is made and a hole is also made thro' the bars above mentioned, in and through which is inserted an iron guide which is made fast to the bar; the sharpened end of which enters the timber and keeps the machine in its place. The sides of the box are about three eighths of an inch thick but at the lower edge on the inside is a rib to give the sides greater strength Near the upper sides inside, are square grooves from end to end
formed by projecting ribs. The ends of the box do not rise so
high as the sides, by about one inch and one fourth. On the up-
per edge of the side pieces on the back end extending about half the
length of the box is fastened or cast an arch upon which play
pinions hereafter mentioned; Through the sides of the box about the
centre in regard to length, and near the bottom, are holes about one
inch and one fourth in diameter, through which passes a round
bar of iron for a windlass from fifteen to eighteen inches long.
To this bar near one end and close to the box, is attached a ratchet
wheel about seven inches in diameter and to the box is fastened
a hasp which plays into the ratchet. On one end of this bar or
windlass a chain is fastened which passes under the timber and
is hooked on to the other end. The windlass is then turned by
a wrench and the chain drawn round it, the hand in the ratch
et holding it fast, by which means the machine is held firmly
to the timber. Near the forward end and near the bottom, two dogs
one on each side five or six inches long are attached to the box, the
ends of which may be driven into the timber to aid in holding
the machine fast. On each end outside one or more perpendicu
lar lines are drawn as guides for placing the machine without referen
to the chisel, another part of the machine may be called the carriage.
It consists of a bottom piece of this shape; see fig. I. of two side pieces
of this shape, see fig. II. And of an upright or end piece of this shap
see fig. III. The edges of the bottom piece are fitted to move in the [illegible]
grooves above mentioned in the inside of the box. The side pieces are
fastened by the straight or lower edges to the bottom piece being just
far enough apart to move within the box. The upright or end piece
is placed at the forward end of, and between the two side pieces, resting
on the bottom piece at the edge of the half circle. Its width at the
bottom is just sufficient to fill the interval between the side pieces
say five and a quarter inches, its height is eighteen inches. it begins
to taper at six and a quarter inches from the bottom and is about [illegible]

and a half inches wide at top. At the edges on the back side are two
ribs which at the bottom and for six or seven inches upwards project
about an inch and one fourth, and then less and less until at the top
the projections or ribs disappear. The side pieces are fastened to the
end piece by screws which pass through the former at the places marked
by dots, and through the projections or ribs. At the top and bottom
of the upright piece is an ear projecting on the fore side and per-
forated by a hole an inch in diameter. About seven and a half
inches above the bottom of the upright piece on the back side are two
projections, level with each other about an inch and a quarter apart
two and a half inches long. Three fourths of an inch in diameter
circular a small hole passing through each longitudinally and through
the upright piece in which are inserted springs which are held fast
by screws inserted in the sides of the circular projections.
The bottom piece is fifteen or sixteen inches long from point to point.
The side pieces about twelve inches long, and at the widest end six
inches, and at the centre three and a half inches wide. About
three and a half inches back of the forward end of the side pieces
are holes about an inch in diameter thro' which passes a crank.
These holes have projections outwards resembling a hub about three inch-
es long to keep the crank steady and prevent it from bending.
The arbor of the crank projects about ten inches on each side of the
machine, and the arms are from fifteen to eighteen inches long.
Within the machine it has the form of a common saw Mill crank.
the semi diameter of the sweep being about three inches, the shape of
the crank being like this see fig IV. From the sweep inside ([illegible])
rises a shaft twenty inches long and one inch in diameter, at the top
it is bent forming almost a right angle and passing over the top of
the upright piece and through the end of it is a hole about half an
inch in diameter. Through this hole and through the holes in the two ears
on the upright piece descends another shaft about an inch in diam-
eter and two feet long and to the lower end of which is fastened a
chisel. This perpendicular shaft is so shouldered at the top as to be

[illegible] up and down by the action of the other shaft. The chisel is
worked by turning the crank which may be turned round or a part
way round, and back as is most convenient, or as is rendered ne-
cessary by the desired depth of the mortise. On one side of the last
mentioned shaft a piece of iron one fourth of an inch square and
about six inches long is fastened, and also just above it a knob
or button. The two springs above mentioned are on each side of
this shaft and press against it. They have on the sides next the
shaft a square notch, which receives the piece of iron fastened
to the shaft, and it is thus prevented from turning. It may be turned
half round whenever it is desirable to face the chisel the other way.
An arbor passes through the other end of each side piece near
the bottom, upon each end of which is a pinion about one and a
half inch in diameter which play in the racks before mentioned. On
the same arbor inside of the side pieces, are two ratchet wheels about
one and a half inches in diameter. And to one end of this arbor out
side the pinion is affixed a small crank about three inches forward of
this arbor, through projections on the tops of the side pieces are holes
thro' which passes another arbor. This arbor opposite to each ratchet
wheel is attached by screws a hand which plays in the ratchet, one
screw entering the arbor on the lower side, the other on the upper
side. The screws project an inch or two from the arbor, the hands
are attached to the outward ends of them, and they being screwed
in or out, give the hands more or less play. One hand has a hook
on the end and draws, the other has not and pushes the wheel
round that is opposite to it, the notches in the two ratchet wheels
being cut so that they may be turned different ways. To give
motion to the arbor and play to the hands, a small frame is made
of this shape see fig. V. The end (a) is inserted in the arbor
near the end inside on the side of the arbor opposite the ratchet
wheel. At (b) is a leaden ball an inch in diameter. Into the
sweep of the crank (a) a flat pin [illegible] is inserted, and when
the crank is turned the pin [illegible] against one side of the V raises the frame which immediately falls and by the motion thus given to the pinions the carriage is moved forward or backward as one or the other of the hands is permitted to play in its ratchet wheel. The position and shape of the V should be such that when the power cam is raising it by passing on one side, the shaft to which the chisel is attached shall rise exactly as much as when it passes on the other side. While one hand is in use the other should be removed, hung upon a pin or confined in some convenient way. A socket one and a half inch deep is made in the lower end of the perpendicular shaft, to receive the shank of a chisel. At the upper end of this socket a hole is made transversely through the shaft to drive out the chisel.

The chisel is about seven and a quarter inches long including the shank. It is formed like other framing chisels except that at the cutting ends on each edge (not speaking here of the cutting edge at the end) on the bevelled side, or side opposite the face, two side pieces or wings project; which one sixteenth of an inch thick next the main part of the chisel, three eighths of an inch wide and extending up the chisel from the cutting edge about two inches. The lower terminations of these side pieces or wings are sharp and are made sharp by bevelling the portion next the main part of the chisel on the inside and the other portion on the outside. By this mode of sharpening the side pieces or wings there is when the chisel is entering the wood an equal pressure on the outside and inside by which they are supported and are not so liable to break as when sharpened in any other way.

Operation. It may be advisable to bore one hole where the mortise is to be. The machine is then placed on the timber its exact position being regulated by a line on the timber and the perpendicular lines on the ends of the machine. It is then made fast by means of the windlass and chains, and of the dogs if necessary. The crank is then turned either quite round or a part way round and back. If the mortise is to be a shallow one, it should be turned only a part way round and back. Turning the crank drives the chisel into the timber and also moves the carriage forward or backward, according as one or the other handle is used

I claim as my invention the combination of the parts as above described constituting a machine for making large timber. The application and use of the several parts in a machine intended for that purpose and the mode of sharpening the side pieces or wings of the chisel

George Page

[illegible] Witnesses
[illegible] Ichiel Day [illegible]
Asaph Harrington

Spec 2.25

(2210 words)

(Granted Apl. 21. 1836)

Drawing